Jan. 22, 1946.  H. T. HALLOWELL, JR  2,393,246
INSPECTION GAUGE
Filed Jan. 23, 1943  4 Sheets-Sheet 1
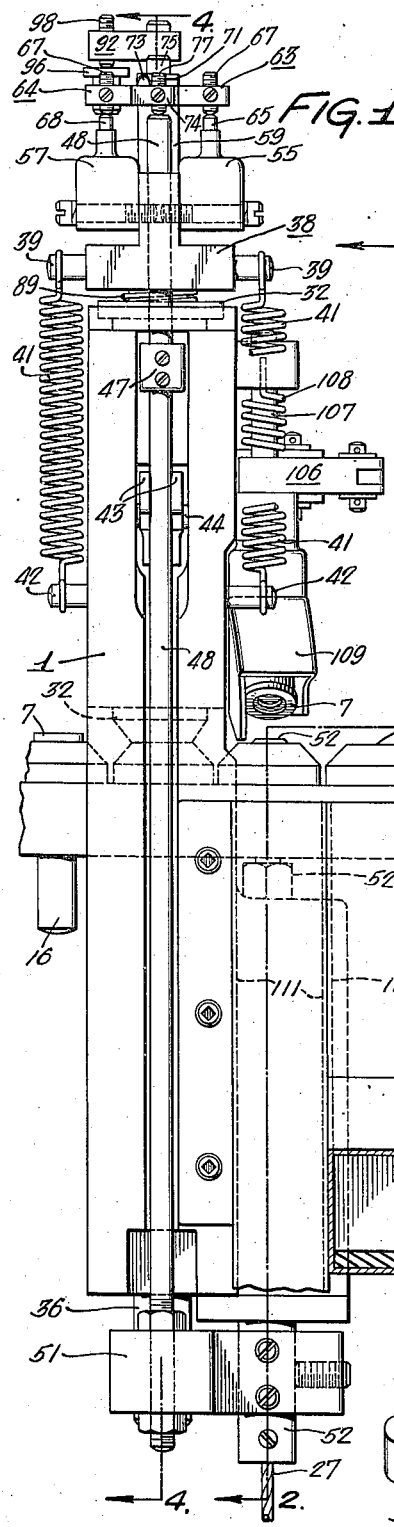
FIG. 1.
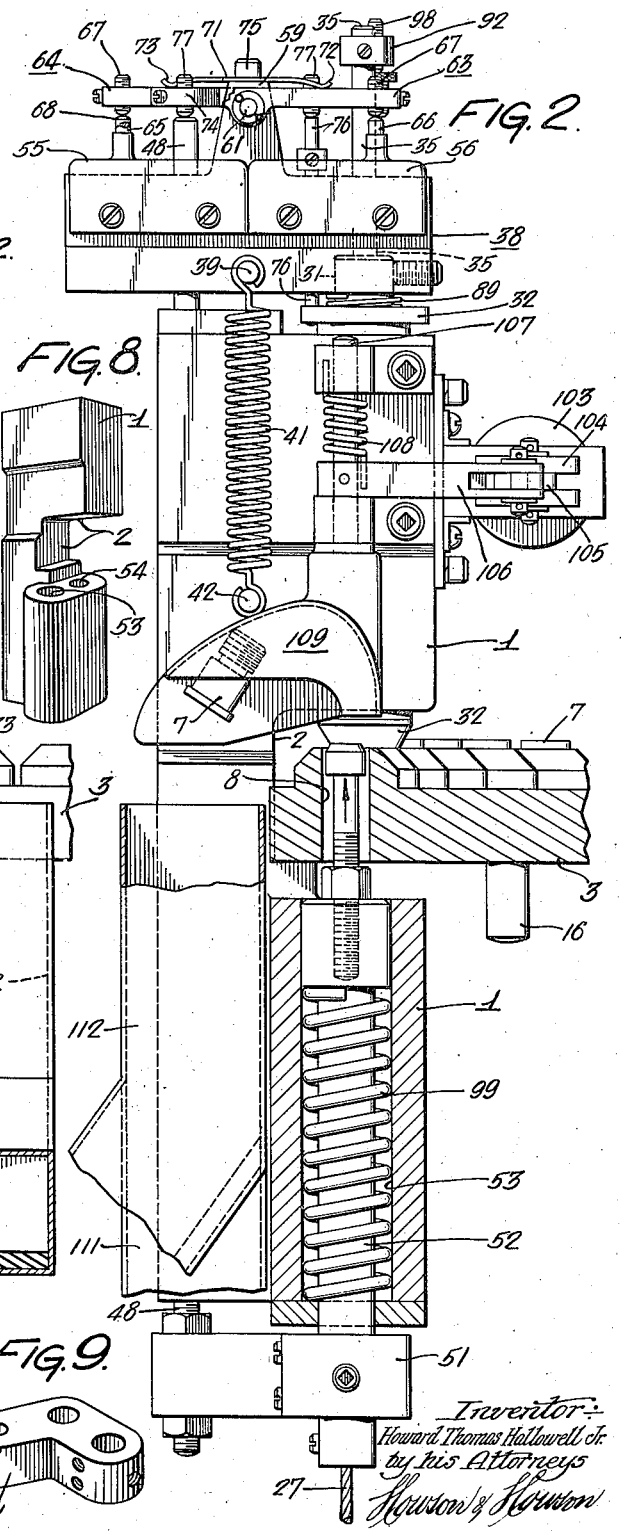
FIG. 2.  FIG. 8.  FIG. 9.
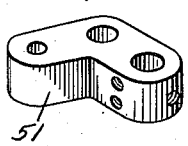
Inventor:
Howard Thomas Hallowell Jr.
by his Attorneys
Howson & Howson Jan. 22, 1946. H. T. HALLOWELL, JR 2,393,246
INSPECTION GAUGE
Filed Jan. 23, 1943 4 Sheets-Sheet 3
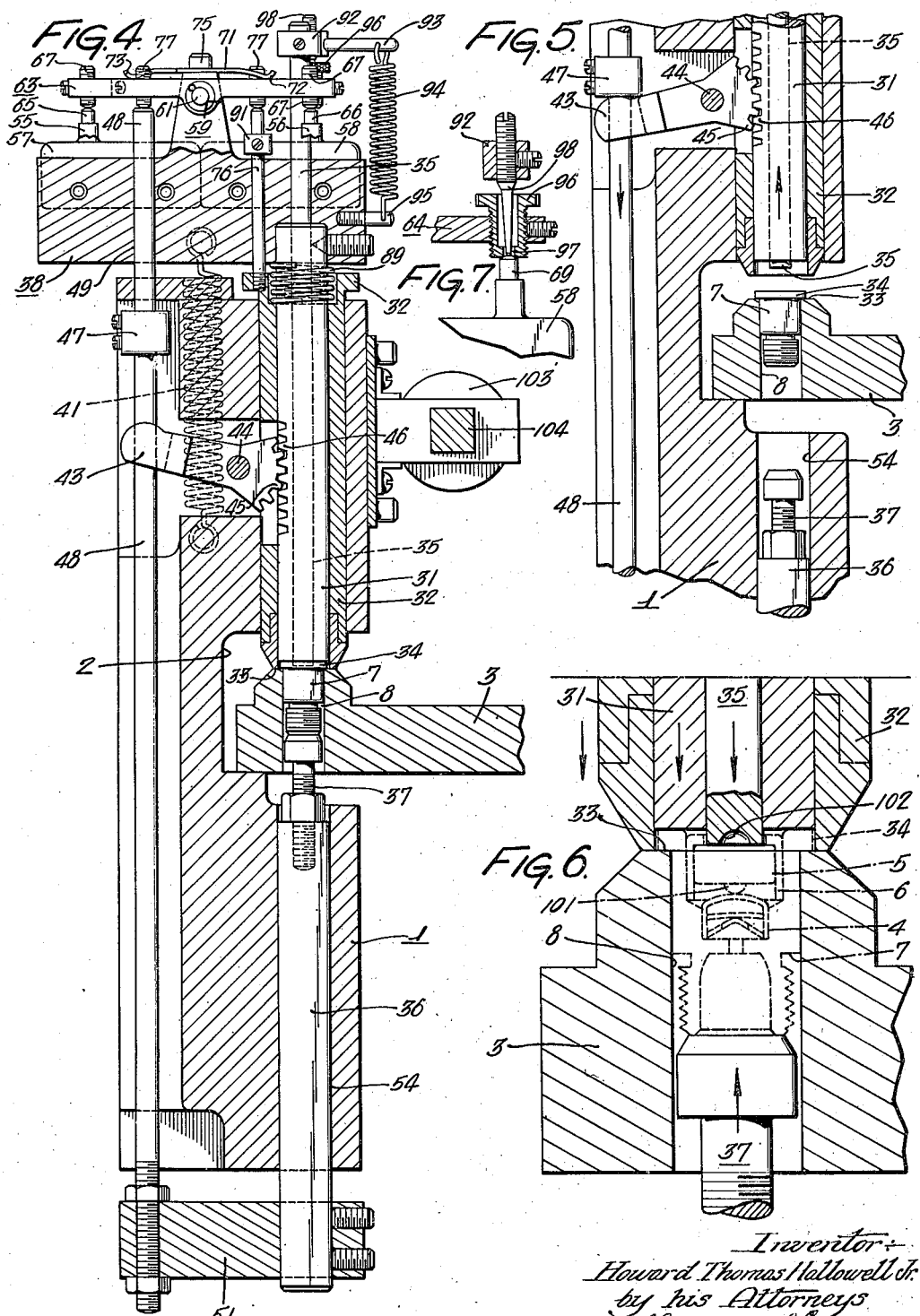

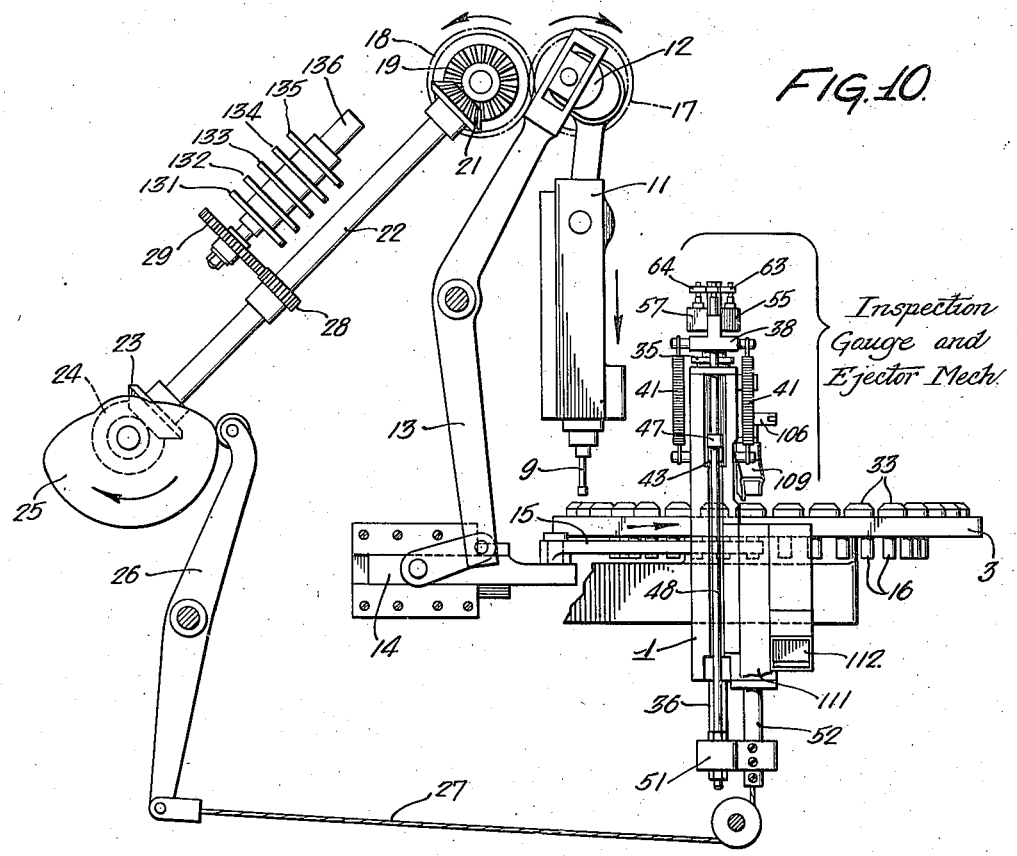
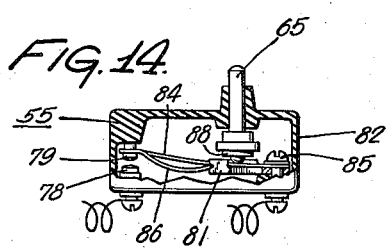
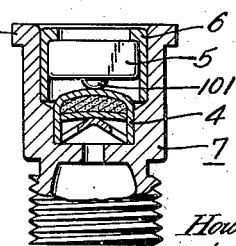
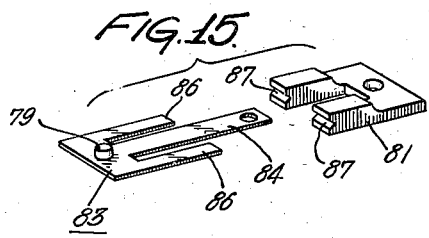

Patented Jan. 22, 1946

2,393,246

UNITED STATES PATENT OFFICE 2,393,246

INSPECTION GAUGE

Howard Thomas Hallowell, Jr., Jenkintown, Pa., assignor to Pennsylvania Manufacturing Company, Jenkintown, Pa., a corporation of Delaware Application January 23, 1943, Serial No. 473,382

9 Claims. (Cl. 73—167)

This invention relates to inspection gauges for use primarily with the assembling machine disclosed in my pending application Serial Number 424,052. The gauge of the present invention while adapted primarily for inspection of priming head assemblies of the type disclosed in the aforesaid application, will be found useful for inspection of other articles or products, and the invention, therefore, is not limited to the particular use herein described.

A principal object of the invention is to provide a gauge which shall be capable of extremely rapid and accurate operation in gauging one or a plurality of vital dimensions in the article under inspection.

More specifically, an object of the invention is to provide a gauge that will function in a single operation to test a plurality of vital dimensions in a given article under inspection.

Another and still more specific object of the invention is to provide an inspection gauge that will function in a single operation to gauge the several vital dimensions of a priming head assembly of the type herein disclosed.

A further object of the invention is to provide in combination with said gauge a means for automatically segregating those of the articles which pass inspection from those others which are rejected as being deficient in one or more of the vital dimensions.

The invention further resides in certain structural and mechanical details hereinafter described and illustrated in the attached drawings, in which:

Figure 1 is an end elevational view of an inspection gauge made in accordance with my invention;

Fig. 2 is a section on the line 2—2, Fig. 1;

Fig. 4 is a section on the line 4—4, Fig. 1;

Fig. 5 is a fragmentary sectional view corresponding to the sectional view of Fig. 4 and illustrating a detail of operation;

Fig. 6 is an enlarged fragmentary sectional view corresponding to Fig. 4 and illustrating another phase of the operation;

Fig. 7 is a section on the line 7—7, Fig. 3;

Fig. 8 is a view in perspective of the relatively fixed body of the gauge detached from the gauge mechanism;

Fig. 9 is a view in perspective of one of the elements of the mechanism appearing at the lower end of Figs. 1, 2 and 4;

Fig. 10 is a diagrammatic elevational view illustrating the gauge in its application to an assembling machine of the type shown in my aforesaid pending application Serial Number 424,052;

Fig. 11 is an exploded view of three of the separate elements of a priming head assembly;

Fig. 12 is a vertical sectional view of said assembly;

Fig. 14 is a sectional view of one of the micro switches employed in the device, and Fig. 15 is a view in perspective showing two elements of the micro switch mechanism detached from the switch assembly.

Figure 3:
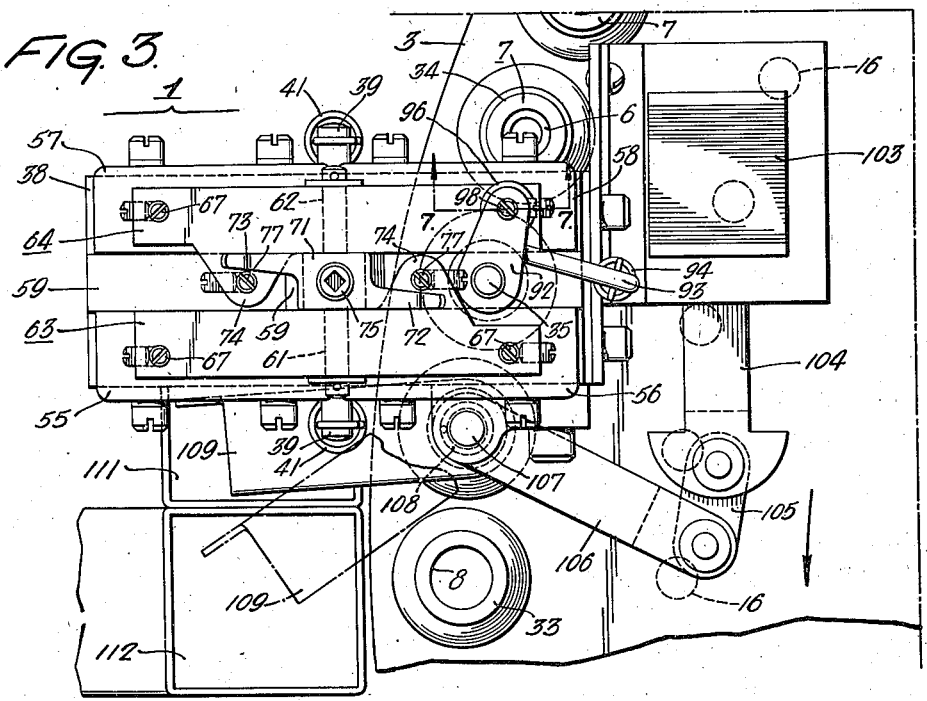
Fig. 3 is a top plan view of the gauge.

With reference to the drawings, the gauge as therein illustrated comprises a body or frame member 1, see Figs. 1, 2 and 8, which forms a relatively fixed support for the operating elements of the gauge. In one side of the frame 1 is a recess 2, into which projects the peripheral portion of a rotary work-table 3 which carries the work elements. In the present instance this table 3 is an element of the assembly mechanism disclosed in my aforesaid pending application Serial Number 424,052, said machine being adapted to assemble the percussion element 4, the firing pin 5, and the retaining cap 6 in the casing 7 of a priming head for explosive shells. The elements 4, 5 and 6 and the assembled head are shown in Figs. 11 and 12.

As shown in Figs. 4 and 6, the work-table 3 is provided in its peripheral portion with a circumferential series of vertical bores 8 which constitute sockets for reception of the casings 7 of the respective priming heads. As the work-table rotates, the elements 4, 5 and 6 are assembled in the casing 7 in the manner set forth in my aforesaid pending application, said assembling mechanism comprising in part a plunger 9 which is supported in a vertically reciprocatory member 11, these parts being actuated from a crank shaft 12 which is connected by means (not shown) with the prime mover of the assembling machine. Means is also provided in the form of a lever 13, a cross head 14 and a pawl 15 pivotally mounted on said cross head for intermittently rotating and properly indexing the work-table 3, said pawl coacting in the present instance with a circumferential series of pins 16 on the under side of the table. The lever 13 is operatively connected to and receives its motion from the shaft 12.

As illustrated in Fig. 10, the inspection gauge is arranged in position to operate upon the completed priming head assemblies, and said gauge incorporates and operates in conjunction with an ejecting device which removes the priming head assemblies from the work-table after inspection and segregates the defective assemblies from those which meet the test requirements. It is to noted further by reference to Fig. 10 that the gauge and ejector mechanisms are operated from the shaft 12 through an intervening transmission which comprises a gear 17 on the said shaft, an intermeshing gear 18, bevel gears 19 and 21, a shaft 22, bevel gears 23 and 24, a cam 25 operatively associated with the last-named bevel gear, and a pivotally mounted lever 26, one end of which engages the cam and the other end of which is connected through a flexible cable 27 with the gauge mechanism. The device as a whole further includes a timing mechanism shown in Fig. 10, the function of which will be hereinafter described, and it is to be noted that this mechanism also is operatively connected through gears 28 and 29 with the shaft 22, and through the latter with the crank shaft 12.

As the priming head assemblies are brought into the inspection position by the indexing means previously described, the cam 25 acts through the lever 26 and cable 27 to permit the active elements of the gauge to move into operative position with respect to the aligned priming head assembly. These elements comprise a plunger 31 which engages the top surface of the priming head; a sleeve 32 embracing the plunger 31 which is adapted to seat against the upper surface 33 of the table 3, upon which also seats the terminal flange 34 of the priming head; a plunger 35 which extends downwardly through the open top of the cap 6 and engages the exposed upper surface of the firing pin 5; and a plunger 36 which extends upwardly in the frame 1 to the under side of the table and through the socket 8 to engage the lower end surface of the priming head, this plunger being provided at its upper end with an adjustable tip 37 in the form of a screw the head of which makes actual contact with the priming head. The manner in which these various elements, which constitute the active inspection fingers of the gauge, contact the various parts of the priming head and the supporting table 3 is clearly illustrated in Fig. 6.

As shown in Fig. 4, the upper end of the plunger 31 is rigidly connected in a head 38 which moves with the plunger. The head 38, see Fig. 1, has a pin 39 projecting from each side thereof, and these pins form anchors for the upper ends of a pair of coiled springs 41, 41, the lower ends of which are connected to corresponding pins 42 on the frame 1. The springs exert a continuous tension tending to draw the head 38 and the plunger 31 downwardly toward and in the frame. Elevation of the plunger 31 and head 38 in the frame is effected solely through a lever 43 which is pivotally connected at 44 to the frame 1, and which is formed at its inner end with a segmental gear 45 which meshes with a rack 46 on the plunger 31. It is to be noted that the sleeve 32 is apertured to provide for passage therethrough of the lever 43. The outer end of the lever 43, which is bifurcated, as shown in Fig. 1, extends into the path of a collar 47 on a rod 48, the upper end of which rod passes slidably through a bore 49 in the head 38 and the lower end of which is secured to a member 51, this member being rigidly connected to the lower end of the plunger 36, see Figs. 1, 2, 4 and 9. The member 51 is also connected to the lower end of an ejector plunger 52 which is slidably supported in a bore 53 in the frame 1. This bore parallels and lies adjacent to the bore 54 which constitutes the guide for the plunger 36. The plunger 52 extends below the member 51, see Fig. 2, and has provision for attaching thereto the end of the flexible connector 27. When the cam acts through the lever 26 to draw the member 51 downwardly, the collar 47 engages the outer end of the lever 43 and thereby elevates the plunger 31, see Fig. 5, and the head 38. Thus, the upward movement of the plunger 31 is accompanied necessarily by a downward retraction of the plunger 36.

Mounted on the head 38 are four micro switches of the character illustrated in detail in Fig. 14. These switches are designated respectively by the reference numerals 55, 56, 57 and 58. At the center of the head 38 is an upstanding pedestal element 59. Projecting from opposite sides of this element are pins 61 and 62 which form pivotal supports respectively for a pair of switch-actuating levers 63 and 64. The lever 63 extends at the opposite sides of the pivot, and its opposite ends overlie the control buttons 65 and 66 respectively of the switches 57 and 58. In each end of the lever is a set screw 67 which respectively overlie and engage the buttons 65 and 66, these set screws affording adjustability between the lever 63 and the buttons 65 and 66. The lever 64 is similarly operatively associated with the control buttons 68 and 69 of the switches 57 and 58, this lever 64 also carrying the adjustable set screws 67 for engagement of the switch buttons. Supported at the top of the pedestal 59 is a leaf spring 71, the opposite ends 72 and 73 of this spring exerting resilient pressure upon the upper surface of the levers 63 and 64 respectively, see Fig. 3, it being noted that each of the levers has a transverse projection 74 which provides a seat for the spring end. In the present instance, the spring is held in place at the top of the pedestal 59 by means of a retaining screw 75.

Referring more particularly to Fig. 4, it will be noted that the rod 48 lies in alignment with the projection 74 of the lever 64, and that a rod 76 extending from the upper end of the sleeve 32 through a bore in the head 38 is similarly aligned with the projection 74 of the lever 63. Each of these projections carries a set screw 77, and these screws are arranged to seat upon the upper ends of the rods 48 and 76 respectively, the spring 71 tending to maintain the levers in the seated relation. Normally the rods 48 and 76 occupy a position in which the levers are supported in a neutral position with respect to the several switches 55, 56, 57 and 58. In this neutral position, the levers 63 and 64 while contacting the switch buttons 65, 66, 68 and 69 do not exert sufficient pressure upon any one of the buttons to displace it downward from the normal elevated position wherein the respective switches are, in this case, open. Under conditions hereinafter described, the levers 63 and 64 will exert pressure upon one or more of the switch buttons, causing a downward displacement thereof and a resulting closing of the switch.

In Fig. 14 illustrating one of the said switches, the switch button 65 is shown in the normal elevated position, and in this position the terminal elements 78 and 79 of the switch are separated, the switch being open. With reference also to Fig. 15, it will be noted that the switch comprises a rigid base element 81 which is secured in fixed position in the casing 82, and a resilient element 83 which is connected to the element 81 and which carries the contact element 79. The contact element 78 is mounted in fixed position in the casing 82. A central arm 84 of the element 83 is secured by a screw 85 to the element 81, and the extremity of each of the shorter arms 86 is seated in a notch 87 in the side of the element 81, the arrangement being such that the arms 86, 86 are flexed or tensioned, as shown in Fig. 14. The arrangement is such that the outer free end of the element 83 is normally held in the elevated position, as shown in Fig. 14, but a very slight downward displacement of the button 65, the inner end of which seats upon the central arm 84 of the element 83, causes the outer end of the latter to move downwardly with a snap action so that the contact element 79 is brought into engagement with the contact 78 to close the circuit. When pressure is released from the button 65, the resilient element 83 will automatically snap back to its normal elevated position. It will be noted that the inner end of the button 65 has an enlarged head 88 which, when the button has been moved inwardly sufficiently to actuate the switch element 83 as described, comes in contact with the side portions of the rigid element 81, this element thereby constituting a stop to limit the inward movement of the switch button.

It will be noted by reference to Fig. 4 that a coiled spring 89 embracing the plunger 31 is confined between the under side of the head 38 and the top of the sleeve 32; and that the rod 76 carries a collar 91 at the top of the head 38, which by engagement with the upper surface of the head limits the separation of the head and the sleeve 32 under action of the spring 89. With this arrangement, if the plunger 31 is elevated and with it the head 38, the sleeve 32 will remain stationary only until the head has moved to an extent bringing it into engagement with the collar 91, after which the sleeve 32 will move upwardly with the plunger 31 as a unit.

The plunger 35 carries at its upper end an arm 92, and projecting from one side of this arm is a pin 93 to which is secured one end of a coiled spring 94, the other end of the spring being connected through a pin 95 with the head 38. This spring thereby exerts pressure tending to draw the plunger 35 downwardly with respect to the head 38. The set screw in the lever 64 which engages the switch button 69 of the switch 58 is in the form of a cup, as shown at 96 in Fig. 7, this cup having an aperture 97 in the bottom in alignment with the top of the button 69. Threaded into the outer end of the arm 92 is an adjustable pin 98 which extends downwardly through the cup 96 and into the aperture 97, and when the plunger 35 is in a normal position, as shown in Fig. 4, the lower end of the pin 98 contacts the top of the button 69.

Insofar as described, the operation of the device is as follows: When the table 3 is being advanced and indexed as described above, the plungers 31, 35 and 36 and the sleeve 32 are retracted, as shown in Fig. 5, this retraction being effected by actuation of the cam 25 which operates in synchronism with the work-table 3 and the other parts of the mechanism. Retraction of the plunger 35 to the elevated position is effected by reason of the contact of the pin 98 with the abutment 69 of the switch 58, it being noted that the construction of the switch as described and as shown in Fig. 14 will permit the switch mechanism to support the weight of the plunger 35 and the pressure exerted through the spring 94. When the advance movement of the table 3 is interrupted, one of the assembled priming heads supported on the table will be in alignment with the fingers of the inspection device, and these fingers will now be permitted by the cam 25 under action of a spring 99 associated with the ejector plunger 52, as shown in Fig. 2, to advance into the relative positions with respect to the work piece as shown in Fig. 6 of the drawings. If the several dimensions of the priming head are correct, the moving parts of the device will be so relatively placed that the switch-actuating levers 63 and 64 will be held in the aforesaid neutral position by the action of the springs 71 and of the rods 48 and 76. If any one of the vital dimensions of the priming head is off in excess of the permitted tolerances, one or other of the micromatic switches 55, 56, 57 and 58 will be actuated, with the results hereinafter described.

More specifically and with reference particularly to Figs. 4 and 6, if the height or thickness of the flange 34 is greater or less than the normal required thickness, this departure from the normal will be reflected in a correspondingly abnormal relative displacement of the plunger 31 and the head 38 with respect to the sleeve 32. This relative displacement will have the effect either of actuating the switch 56 in the event that the flange is too thick, or the switch 55 in the event that the flange is too thin. In this action, it is to be noted that the sleeve 32 and the rod 76 which is carried by this sleeve and which normally supports the lever 63 in the neutral position as described, maintains an established position by reason of the engagement of the sleeve 32 with the table 3, and these parts thereby provide a fixed datum from which the thickness of the flange 34 may be measured. If the flange is too thick, the head 38 will be correspondingly elevated from the normal position through the plunger 31, and this elevation of the head 38 will tend to lift the lever 63 off of the supporting rod 76 on the sleeve 32. The spring 71, however, will tend to move the right hand end of the lever 63, as viewed in Fig. 2 for example, downwardly to thereby maintain contact with the supporting rod 76, and the resulting tilting of the lever on its pivot pin 61 will result in an actuating pressure upon the button 66 of the switch 56. If on the other hand the flange is too thin, the opposite effect is obtained, in that in that case the head 38 will have moved downwardly to a position below its normal, and this downward movement of the head will result through the rod 76 in an oscillation of the lever 63 in a counterclockwise direction, as viewed in Fig. 2, with the further result that the button 65 of the switch 55 will be depressed and the switch thereby actuated.

Inspection of the overall dimension of the priming head is similarly effected by the plunger 31 and the plunger 36. If the thickness of the flange 34 is correct, then these parts act in effect to check the axial length of the casing 7 of the priming head from the under side of the flange 34 to the lower end of the head. If the length of this part is too great, the plunger 36 will be depressed from its normal position, with the result that the rod 48 which would otherwise support the switch lever 64 in a neutral position no longer provides that support, and will permit the spring 71 to move the left-hand end of the lever 64, as viewed in Fig. 4, downwardly from the neutral position, thereby depressing the button 68 of the switch 57 and actuating that switch. If the aforesaid longitudinal dimension of the casing 7 is too small, the opposite occurs, in that the plunger 36 and the rod 48 will now occupy a position slightly above the normal, thereby oscillating the lever 64 from the neutral position and in a clockwise direction as viewed in Fig. 4, with resulting depression of the button 69 of the switch 58 and actuation of that switch.

The device also functions through the plunger 35 to inspect the position of the firing pin 5 in the assembly. Normally the pin 5 will occupy the position shown in broken lines in Fig. 6, wherein the teat 101 on the under side of the firing pin bears against the percussion element 4. The upper flat surface of the firing pin 5 under these circumstances will occupy a predetermined position below the upper surface of the casing 7. If the firing pin 5 is in the normal position in the assembly and assuming that the flange 34 has the required thickness, then the head 39 and the plunger 35 will occupy relative positions bringing the lower end of the pin 98 into touching contact with the button 69 of the switch 58. If the position of the firing pin 5 is too low in the assembly, as will occur if the position of the pin in the assembly is reversed, then the plunger 35 will occupy a position below the normal one, it being noted that the lower end of the plunger 35 is provided with a recess 102, see Fig. 6, which would then receive the teat 101 and permit the bottom surface of the plunger to engage the surface of the body portion of the firing pin around the teat. This depressed position of the plunger 35 through action of the spring 94 brings pressure to bear through the pin 98 upon the button 69 of the switch 58, thereby to actuate the latter. Either one of two different defective dimensions in the assembled priming head will thereby result in an actuation of the switch 58.

Figure 13:
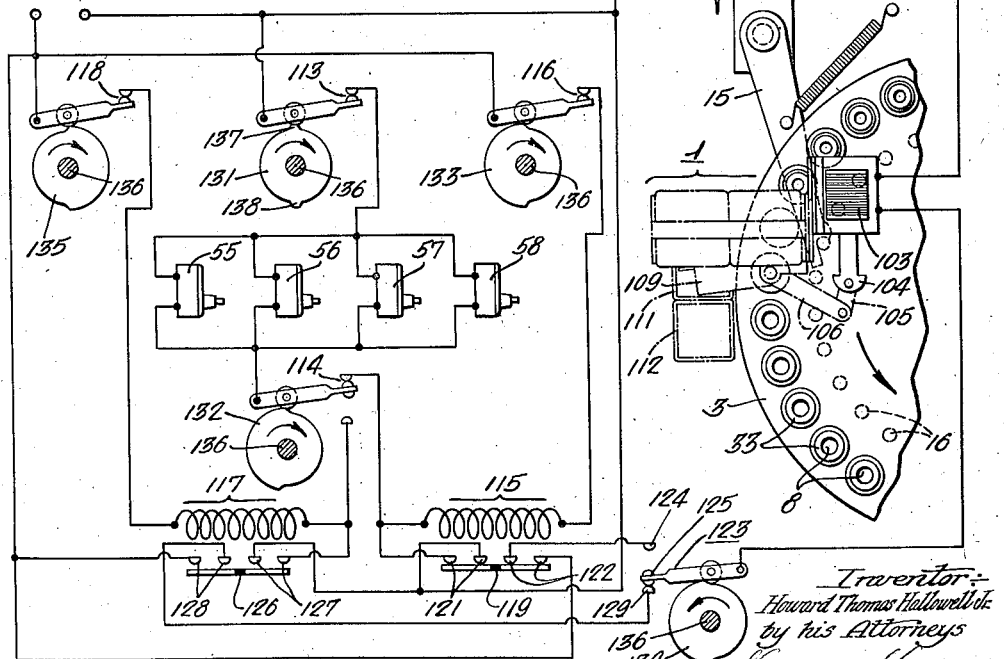
Fig. 13 is a diagrammatic view illustrating the details of the electrical control mechanism.

The switches 55, 56, 57 and 58 form elements of an electrical system shown in Fig. 13, which system includes a solenoid 103. The plunger 104 of this solenoid is connected through a link 105 with an arm 106, and this arm is secured to a vertical rock shaft 107 journaled on the frame 1, as best shown in Fig. 2. A coiled spring 108 is supported on the shaft 107, one end of the spring being secured to the frame 1 and the other to the arm 106 whereby the spring tends to retain the arm 106 in a position shown in Fig. 3, wherein the plunger 104 of the solenoid 103 is extended. Secured to the lower end of the shaft 107 is a hood-like deflector 109, the inner end of which overlies the path of the priming head assemblies on the work-table 3, while the other end of the hood overlies the mouth of a chute 111. A second chute 112 immediately adjoins the chute 111, and when the solenoid 103 is energized, the resulting movement of the plunger and of the arm 106 oscillates the deflector 109 around the axis of the shaft 107, so that the outer end thereof overlies the mouth of the chute 112, as shown in broken lines in Fig. 3. The inner end of the deflector, see Figs. 1 and 3, directly overlies that one of the series of priming head assemblies on the work-table 3 which immediately adjoins the inspection position, so that after any gauging operation has been completed, the next advance movement of the table 3 will carry the inspected priming head into a position under the inner end of the deflector. Also the ejector plunger 52 occupies a position directly under the inner end of the deflector 109, so that when any one of the priming heads has been moved with the table 3 to a position under the deflector, it is also in direct alignment with the ejector 52. When the ejector is moved upwardly by action of the spring 99, the aligned priming head will be ejected from its socket in the table 3 upwardly into the deflector which is shaped so as to deflect the ejected head outwardly, as shown in Fig. 2, and downwardly into the mouth of the chute 111 or the chute 112, depending on the angular position of the deflector with respect to the axis of the shaft 107.

It is to be noted that at the same time the ejector 52 moves upwardly in the ejection operation, the plungers 31, 35 and 36 and the sleeve 32 of the inspection device are moving into operative engagement with the adjoining and immediately following one of the priming heads in the table. The upward movement of the ejector 52 is terminated by the engagement of the plunger 36 with the under side of the priming head undergoing inspection. It is to be noted further that the plunger 31 will have moved into engagement with the upper surface of the said priming head before the plunger 36 engages the under side, so that the priming head will be held solidly in its socket against the action of the plunger 36 which is brought sharply into engagement with the under side of the priming head by action of the spring 99.

The function of the electrical system shown in Fig. 13 is to provide a delayed action of the solenoid 103 such that when one of the priming heads in the gauging position has been inspected, the necessary provision will be made for actuation of the solenoid 103 to insure the subsequent discharge of that particular priming head in the next cycle of operations into the proper one of the pins 111 and 112. To this end, the electrical system comprises a circuit which includes a cam-actuated switch 113, the several switches 55, 56, 57 and 58, which are arranged in parallel, and a cam-actuated two-way switch 114. When the switch 114 is in one of its positions, see Fig. 13, the circuit extends through a coil 115 (of a magnet or solenoid, not shown), and a cam-actuated switch 116. When the switch 114 is in the other position of adjustment, it completes the circuit through the coil 117 (of a second magnet or solenoid, not shown), and a cam-actuated switch 118.

The coil 115 constitutes the actuating element of a compound switch 119 containing two sets of terminals, 121 and 122 respectively. When the coil is energized, a holding circuit for the coil 115 is completed, said circuit including the two terminals 121. The terminals 122, which are also connected together when the coil is energized, as shown in Fig. 13, are in another circuit which is controlled by a two-way cam-actuated switch 123. Thus when the terminals 122 are electrically connected by energization of the coil 115, one of the fixed terminals 124 of the switch 123 is energized, and if the movable element 125 of the switch 123 is moved into contact with the element 124, then the circuit of the solenoid 103 is completed and this solenoid energized with resultant adjustment of the deflector 109.

As previously set forth, the coil 117 is associated with a corresponding compound switch 126. Two of the terminals 127 of this switch, when connected by actuation of the switch 126, complete a holding circuit for the coil 117. The other two terminals 128 are established in a circuit which is controlled also by the two-way switch 123 which contains the solenoid 103. When the terminals 128 are electrically connected, as by energization of the coil 117, the terminal element 129 of the switch 123 is energized, and if the movable terminal 125 is then in the position in which it is shown in Fig. 13, the circuit which contains the solenoid 103 will be completed and this solenoid energized, with the result that the guide member 109 is oscillated from its normal position over the chute 111 to a position over the chute 112.

The cams 131, 132, 133, 134 and 135 are mounted in the present instance upon a common shaft 136, see Fig. 10, which is operatively connected through the gears 28 and 29 with the shaft 22, and which, therefore, operates in synchronism with the other elements of the mechanism. The cam 131 has two projections 137 and 138 which are arranged to close the switch 113 when the elements of the inspection mechanism are in the active inspecting position with respect to the work piece, as shown in Fig. 4, the projections 137 and 138 of the cam alternating in this function and closing the switch 113 for successive inspection operations. The cam 132 is formed so as to shift the switch 114 after approximately each 180° of revolution so as to alternately and successively open and close the circuits which contain the coils 115 and 117 respectively. In Fig. 13, it will be noted that the projection 137 is in position to close the switch 113 and the switch 114 has just been moved by the cam 132 to a position completing the circuit of the coil 115. The switch 113 is only momentarily closed, and will be closed again when the cam 131 has moved through 180° of rotation so as to bring the projection 138 into the position now occupied by the projection 137. A corresponding 180° movement of the cam 132, however, will result in the dropping of the movable element of the switch arm 114 into a position closing the circuit of the coil 117, so that when the projection 138 of the cam 131 momentarily closes the switch 113, the switch 114 will be in a position to open the circuit of the coil 115 and close the circuit of the coil 117.

The cam 133 is formed so as to retain the switch 116 closed during 180° of rotation of the cam and to release the switch to the open position during the other 180° of angular movement. As shown in Fig. 13, the switch 116 is closed, and will remain closed during the next 180° of rotation of the cam 133. It is now apparent that with the several switches 113, 114 and 116 in the positions in which they are shown in Fig. 13, which positions will occur when the elements of the inspection device are in the operative position with respect to one of the priming head assemblies, as illustrated, energization of the coil 115 will depend entirely upon whether or not one of the switches 55, 56, 57 or 58 has been closed due to defect in the priming head assembly. If no defect is present, the circuit will remain unenergized, and if unenergized, then there will be no closing of the compound switch 119 and the terminal element 124 of the switch 123 will remain unenergized. When after 180° of rotation of the cam 134 therefore the switch element 125 is brought into contact with the switch element 124, the solenoid 103 will remain unenergized and the deflector 109 will remain in its normal position directing the said priming head when ejected into the chute 111. If one of the switches 55, 56, 57 or 58 is energized, then the switch 119 will be closed and the coil 115 energized. The terminal element 124 will then be energized, and in the next cycle of operations, when the inspected defective article has moved to the ejection position and the movable element 125 of the switch 123 has engaged the live terminal 124, the resulting actuation of the solenoid 103 will move the deflector 109 to a position wherein the priming head will be ejected to the reject chute 112.

It will be apparent that energization of the coil 115 does not result in an immediate actuation of the solenoid 103. Such energization merely sets the circuit of the solenoid so that when that circuit is completed by a subsequent actuation of the switch 123, which occurs just before the beginning of the next cycle, the solenoid 103 will then be energized. This delay in the actuation of the solenoid 103 is necessary in order to permit the inspected article to advance from the inspection station to the ejection station, wherein at the beginning of the next cyclic operation of the inspection device, the previously inspected priming head is ejected from the work-table. Each energization of the coil 103 is only momentary by reason of the action of the cams 133 and 135 and the associated switches.

The circuit of the coil 115 remains closed independently of the switches 113 and 114 by reason of the holding circuit which includes the terminals 121, which circuit is completed by the closing of the switch 119 as previously described. The circuit of the coil 115 remains closed until completion of the subsequent ejection operation, and the circuit which contains the coil 117 now takes over the current inspection operation. After one cycle of operations which comprises a 180° movement of the several cams from the position in which they are shown in Fig. 13, the cam 132 will have permitted the movable arm of the switch 114 to move downwardly into a position to close the circuit of the coil 117. At this moment, the projection 138 of the cam 131 closes the switch 113 and the switch 116 will also have been closed by the cam 135. Energization of the coil 117 will then depend entirely upon whether or not one of the switches 55, 56, 57 or 58 has been closed. If none of these switches is closed and the priming head under test is satisfactory, the switch 126 will remain open and the terminal element 129 of the switch 123 will remain unenergized. In the subsequent cycle, therefore, the deflector 109 will remain in position overlying the chute 111. If the priming head under test is defective, the coil 117 will be energized, the switch 126 closed and the terminal element 129 energized, and in the subsequent ejecting operation, therefore, in which the priming head now under test is being rejected, the solenoid 103 will be actuated to swing the guide hood 109 to a position over the reject chute 112. It will be apparent, therefore, that simultaneously with each inspection operation, the priming head which was inspected in the previous operation will be ejected from the work-table and will be guided by the deflector 109 either to the chute 111 or the chute 112, depending on whether the priming head passed inspection or not.

I claim:

1. In a gauge, opposed relatively movable gauging elements, resilient means tending to draw said elements together, electric switch means movable bodily with one of said elements, a resilient actuator operatively associated with said switch means, and means movable with the other of said elements for controlling the operation of said actuator in accordance with the relative positions of said elements.

2. In a gauge, relatively movable gauging elements, a pair of electric switches movable bodily with one of said elements, a pivoted actuating lever common to said switches, a spring exerting resilient pressure on said lever tending to move it in a direction to actuate one of said switches, and means movable with the other of said elements and reactive with the lever in opposition to said spring.

3. In a gauge, relatively movable gauging elements, a pair of electric switches movable bodily with one of said elements, a switch-actuating lever common to both of said switches and pivotally supported on said element at a point intermediate the switches, a spring on said element exerting resilient pressure tending to turn the lever on its pivot towards one of said switches, and a member movable with the other of said elements and reactive with the lever in opposition to said spring.

4. In a gauge, opposed relatively movable gauging elements, an electric switch bodily movable with one of said elements, means including a member movable with the other of said elements for controlling operation of the switch in accordance with the relative positions of said elements, resilient means tending to draw said elements together, means for retracting one of said elements, and means for operatively connecting the last-named element with the other of the elements whereby retraction of the first-named element results automatically in a retraction of the other element.

5. In a gauge, opposed relatively movable gauging elements, an electric switch bodily movable with one of said elements, means including a member movable with the other of said elements for controlling operation of the switch in accordance with the relative positions of said elements, resilient means tending to draw said elements together, means for retracting one of said elements, and lost motion means for operatively connecting the last-named element with the other of the elements whereby retraction of the first-named element results automatically in a delayed retraction of the other element.

6. In a gauge, the combination with a work support, of a pair of relatively movable gauging elements, resilient means for urging one of said elements into engagement with the support, resilient means urging the other of said elements into engagement with said work piece, an electric switch movable with one of said elements, and switch-actuating means including a member on the other of said elements operative to control the operation of said switch in accordance with the relative positions of said elements.

7. In a gauge for priming heads of the character described, a gauging element adapted to contact the head end of said priming head, a second gauging element adapted to contact the other end of said priming head, said elements being relatively movable, a pair of electric switches movable bodily with one of said elements, means including a member movable with the other of said elements for operating said switches selectively if the said elements when in mutual contact with the said ends of the priming head are abnormally close together or far apart, a third gauging element for contact with the firing pin at the head end of said priming head, and means for operatively connecting the said third gauging element with one of said electric switches whereby an abnormal relative displacement of the said third element with respect to one of the first-named elements when said elements are in contact with the priming head will actuate said switch.

8. In a gauge for priming heads of the character set forth, the combination with a support for said priming head, of a plurality of relatively movable gauging elements adapted respectively to contact the respective ends of the priming head, the firing pin at one end of the priming head and the work support, electric switch means movable bodily with one of said elements, and means including a member carried by each of the other of said elements for actuating the said switch means if the said elements when in contact with the priming head and with the support are abnormally positioned with respect to each other.

9. In a gauge for priming heads of the character described, the combination with a support for said priming head; of a gauging element adapted to contact the head end of said priming head; electric switch means movable bodily with said gauging element; a plurality of additional gauging elements adapted respectively to contact the firing pin at the head end of said priming head, the opposite end of the priming head and the said support in proximity to said head end; and means including a member movable with each of said additional gauging elements for actuating the switches if the said elements when in contact with the priming head and with the support are abnormally positioned with respect to each other.

HOWARD THOMAS HALLOWELL, Jr.